United States Patent
Emr et al.

[15] 3,669,988
[45] June 13, 1972

[54] METHOD OF ISOLATING AND PURIFYING SULPHONEPHTHALEIN DERIVATIVES OF IMINODIACETIC ACID AND ITS SALTS

[72] Inventors: Antonín Emr; Rudolf Přibil, both of Prague, Czechoslovakia

[73] Assignee: Ceskoslovenska akademie, ved, Prague, Czechoslovakia

[22] Filed: Oct. 22, 1968

[21] Appl. No.: 769,703

[30] Foreign Application Priority Data

Oct. 25, 1967 Czechoslovakia..................7549-67

[52] U.S. Cl. .........................................260/327 S
[51] Int. Cl. ............................................C07d 89/06
[58] Field of Search ..............................260/327 S

[56] References Cited

UNITED STATES PATENTS 2,980,696  4/1961  Körbl...................................260/327

2,745,720  5/1956  Schwarzenbach et al. ..............23/230

*Primary Examiner*—Henry R. Jiles
*Assistant Examiner*—Cecilia M. Shurko
*Attorney*—Michael S. Striker

[57] ABSTRACT

Object of the invention is isolation and purification of sulphonephthalein derivatives of iminodiacetic acid, prepared in the known manner by condensing sulphonephthaleins having free 3 and 3' positions, with formaldehyde and iminodiacetic acid. The method consists in precipitating aqueous solutions of alkali metal salts of said derivatives as insoluble salts with bivalent cations selected from the group consisting of barium, calcium and strontium, isolating the precipitate in pure condition by washing, dissolving the precipitate in an acid, precipitating said bivalent cations, separately the filtrate, adding alkali metal cations to the resulting liquid and isolating the sulphonophthalein derivative of iminodiacetic acid in the form of its alkali metal salt by adding a water-miscible non-solvent such as ethanol and separating, washing and drying the precipitate.

4 Claims, No Drawings

METHOD OF ISOLATING AND PURIFYING SULPHONEPHTHALEIN DERIVATIVES OF IMINODIACETIC ACID AND ITS SALTS

SUMMARY OF INVENTION

The manufacture of the above said sulphonephthalein derivatives of iminodiacetic acid has been described e.g. in the U.S. Pat. No. 2,745,720 or in German Pat. No. 1,085,537. The condensation of sulphonephthaleins with formaldehyde and iminodiacetic acid is carried out either in an alkaline medium or in glacial acetic acid in presence of cations of alkali metals. The products are precious chelatometric indicators very useful in analytical chemistry, their utility depending, however, strongly upon their degree of purity.

Until now, the marketed products, isolated and purified by usual methods, such as crystallization and precipitation with bad solvents, contained up to 20 percent of side products, most of them forming also colored chelates with metal cations. The purity degree often alters and is, generally, insufficient for some special purposes, e.g. for spectrophotometric titrations of tiny amounts of some metals in presence of prevailing amounts of another metal yielding similar intensively colored chelates with characteristic absorption maxima, e.g. for assaying thallium in a concentration as low as 20 gamma in presence of high concentrations of lead. Besides, usual purification methods, particularly recrystallization, were connected with heavy losses of the product, due to unusually high solubility of said derivatives. Regarding the high price of the products, the purification process could not be led till to its end by repeating the operation. Thus, for instance xylenol orange is generally no chemically individual substance; chromatographical analysis shows that it is a mixture of several—up to six—different dyestuffs, their percentage in the marketed product attaining up to 20 percent. All of said byproducts, except two, show pronounced metallochromic properties. Thus, all constants of xylenol orange described in the literature, derived e.g. from absorption spectra of the substance itself or of its colored complexes with some metals, have but a relative validity. Their exact reproducibility is bound to the use of always the same product having always the same content of the same byproducts. This requirement is, however, hardly to be fulfilled, the amount and even the sort of the impurities changing every batch.

The above mentioned shortcomings are removed by the purification process according to the present invention, consisting in that raw condensation products of sulphonephthaleins with formaldehyde and iminodiacetic acid or its salts, particularly sodium salts, dissolved in water, are precipitated with a soluble barium or calcium or strontium compound, and the precipitate is separated. Simple or double salt thus obtained is then suspended in water and the suspension is treated with sulphuric acid, the insoluble metal sulphate is separated, a substance yielding alkali metal cations such as sodium acetate is added and the solution is precipitated with a water-miscible non-solvent of the salt, e.g. with ethanol. The crystalline precipitate thus obtained is washed with the same non-solvent and dried. Due to the fact that all intermediates are insoluble, the yield of the pure product amounts to 80 – 90 percent of the theoretical value. In spite of the high yield, the degree of purity is unusually high. The purification process can be repeated several times, if desired, without encountering considerable losses.

Barium compounds are most appropriate precipitating agents since barium sulfate is practically insoluble. Calcium or strontium compounds can be used too, if traces of calcium or strontium do not matter, or if they are finally removed e.g. by repeating the precipitation with a water-miscible non-solvent.

Aliphatic alcohols, particularly ethanol, are most suitable and inexpensive water-miscible non-solvents, but other liquids such as dioxane or similar may be used instead, if desired. Although anybody skilled in the art could easily find other water-miscible non-solvents which are easily removed from the crystalline product, there is apparently no need to do so, ethanol being completely satisfactory in every respect.

High yields, allowing to repeat economically the purification process several times, if desired, open a possibility of industrial manufacture of pure chelatometric indicators having always the same properties, chromatographically uniform and thus advantageously utilizable in all applications where said indicators are used, and also utilizable in some new applications.

Insolubility of barium and other salts of sulphonephthalein derivatives of iminodiacetic acid allows, at suitable conditions, even gravimetric assays.

The method according to the invention is quite simple, requiring neither expensive reagents nor a complex equipment, is perfectly suitable not only for primary manufacture, but also for refining goods obtained by other methods.

FOllowing examples show the new refining method in connection with the two known methods by which the synthesis is usually carried out.

EXAMPLE 1

2 g of sodium hydroxide were dissolved in 22 ml of water. To the solution, 2.8 g of iminodiacetic acid, 3.8 g of o-cresol sulphonephthalein and 3 ml of a 37 percent aqueous formaldehyde solution were added. The mixture was left standing for 48 hours at room temperature. Then an equivalent of barium chloride solution was added, the precipitated barium salt sucked off, washed with water and dried. The yield was 80 – 90 percent of the theoretical amount.

1 g of the barium salt was suspended in water and sulphuric acid was gradually added until the original dark color turned to light yellow. The separated barium sulphate was filtered off, in the filtrate 0.5 g of sodium acetate was dissolved and 50 ml of ethanol were added. The separated crystalline sodium salt was sucked off, washed with ethanol and dried. The yield of sodium salt of xylenol orange amounted to 80 – 90 percent.

EXAMPLE 2

5 g of sodium acetate were dissolved in 25 ml of glacial acetic acid. To the solution thus obtained 2.8 g of iminodiacetic acid, 4.7 g of thymol blue and 3 ml of a 37 percent aqueous formaldehyde solution were added and the mixture was heated 4 – 10 hours on a water bath. The pH value of the reaction product was then raised above 7 by adding a sodium hydroxide solution.

Insoluble barium salt was precipitated by adding equivalent amount of barium chloride. The precipitate was isolated and further processed according to Example 1.

It is also possible to precipitate the barium salt directly from acidic solutions by adding a solution of barium hydroxide in equivalent amount.

EXAMPLE 3

1.70 g of sodium hydroxide and 3 g of iminodiacetic acid were dissolved in 18 ml of water. To the solution thus obtained 3.2 g of o-cresol sulphonephthalein ("cresol red") and 3 ml of 37 percent aqueous formaldehyde solution were added. The reaction mixture was left standing for 48 hours at room temperature, and then heated for 4 hours to 70° C. under reflux. The solution, still warm, was mixed with a solution of 6.2 g barium chloride (dihydrate) in 15 ml of water. The precipitation was finished by adding 70 ml of ethanol. Next day the precipitate was sucked off and washed first with 65 percent ethanol and then with anhydrous ethanol till the filtrate, first dark red, turned to light yellow. The sodium-barium salt of xylenol orange thus obtained weighed, after having been dried at 80° to 100° C., 8.5 – 9.0 g.

5 g of the sodium - barium salt was dissolved in 20 ml of normal (one mol) hydrochloric acid and precipitated at 20°–50° C. with 20 ml of normal sodium lye and 75 ml of ethanol. The precipitated salt was sucked off, washed with ethanol until the filtrate was colorless and dried at 80°–100° C.

2 g of the re-precipitated sodium-barium salt was dissolved at 70°–80° C in a mixture of 7 ml of water with 4 ml of glacial acetic acid and to the solution thus obtained 1.2 ml of a 15 percent (by volume) sulphuric acid was dropwise added while stirring. The solution was stirred with active charcoal and left to cool down. The barium sulfate was filtered off and washed on the filter with 2 to 3 ml of water. 3 g of anhydrous sodium acetate were added to the joint filtrates and the solution was added dropwise while stirring to 160 ml of ethanol (96 percent). A solid, well filterable precipitate was obtained, which was filtered off, washed with ethanol and dried at 70° C. The yield of high grade sodium salt of xylenol orange amounted to 1.2 to 1.5 g.

EXAMPLE 4

Commercial methylthymol blue was dissolved in 17 ml of water, 8 g of anhydrous sodium acetate were added and barium salt was precipitated by adding a boiling aqueous solution of 8 g barium chloride dihydrate in 17 ml of water to the 70° C. solution. 50 ml of ethanol were stirred into the mash of precipitated barium salt and the mixture was left standing overnight. Then it was sucked off and washed until the filtrate was colorless. The barium salt, dried at 70° to 100° C., weighed 4.9 to 5.3 g.

Sodium salt was made free in following way. 1 g of the barium salt of methylthymol blue was dissolved at 70° C. in a mixture of 2 ml of water and 1.2 ml of glacial acetic acid, whereafter 1.8 ml of a 15 percent (by volume) sulphuric acid was added. After adding active charcoal the precipitated barium sulfate was filtered off and washed with 1.5 to 2 ml of water. 2 g of anhydrous sodium acetate were dissolved in joint filtrates and the solution stirred dropwise into 80 ml of ethanol. Next day the precipitated sodium salt of methylthymol blue was sucked off, washed with ethanol and dried at 70° C. The yield amounted to 0.6 to 0.65 g of pure product.

If desired, the product can be reprecipitated by dissolving it (1 g) in a mixture of 2 ml of 33 percent (by weight) aqueous sodium acetate solution and 1 ml of glacial acetic acid. The solution is stirred dropwise into 40 ml of ethanol (96 percent). Next day the precipitate was sucked off, washed with ethanol and dried at 80° C. The yield was 0.9 – 1.0 g of high grade methylthymol blue (sodium salt).

We claim:

1. A process for preparing sulphonephthalein derivatives of iminodiacetic acid in the form of their alkali metal salts of a high degree of purity having the formula I

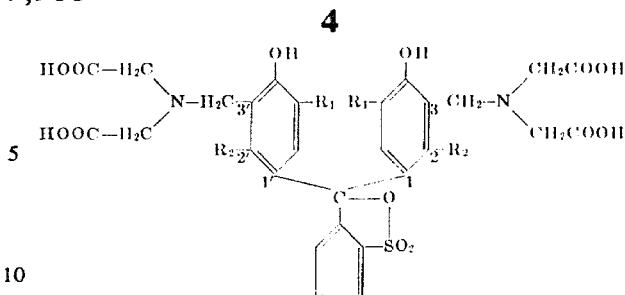

wherein $R_1$ is $CH_3-$ or

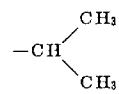

and $R_2$ is $H-$ or $CH_3-$ and X is an alkali metal atom by condensing a sulphonephthalein having the Formula II

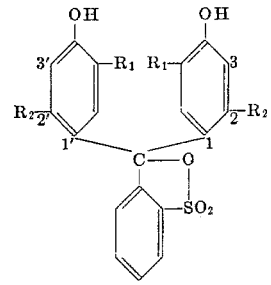

wherein $R_1$ and $R_2$ are as above defined with formaldehyde and nitrilotriacetic acid or the sodium salt thereof, comprising the steps of adding an aqueous solution of a water soluble barium, strontium or calcium salt to a solution of the formed sulphonephthalein derivative of iminodiacetic acid, separating the slightly soluble barium strontium or calcium salt of the sulphanephthalein derivative thereby formed, adding sulfuric acid to said salt of the sulphonephthalein derivative, isolating the barium, strontium or calcium sulphate formed from the reaction mixture and introducing a water-miscible non-solvent for the said derivative in the presence of an alkali metal salt to effect precipitation of the sulphonephthalein derivative of iminodiacetic acid in the form of its alkali metal salt.

2. The process of claim 1, wherein said water-miscible non-solvent is a lower aliphatic alcohol.

3. The process of claim 1 wherein said water-miscible non-solvent is ethanol.

4. The process of claim 1, wherein the isolated barium, strontium or calcium salt of said sulphonephthalein derivative of iminodiacetic acid is first dissolved in a mineral acid, thereafter reprecipitated by addition of alkali metal hydroxide and then treated with said sulfuric acid.

* * * * *